US007496906B2

(12) United States Patent
Black-Ziegelbein et al.

(10) Patent No.: US 7,496,906 B2
(45) Date of Patent: Feb. 24, 2009

(54) EVALUATION OF A CODE SEGMENT

(75) Inventors: Elizabeth Ann Black-Ziegelbein, Austin, TX (US); Oltea Mihaela Herescu, Austin, TX (US); Joel David Ziegelbein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 10/815,208

(22) Filed: Mar. 31, 2004

(65) Prior Publication Data
US 2005/0223363 A1 Oct. 6, 2005

(51) Int. Cl.
G06F 9/45 (2006.01)
(52) U.S. Cl. ........................ 717/145; 717/124; 717/125; 717/126; 717/127
(58) Field of Classification Search .......... 717/124–127
See application file for complete search history.

(56) References Cited

U.S. PATENT DOCUMENTS

| 7,062,755 | B2* | 6/2006 | Partamian et al. ........... 717/124 |
| 7,171,588 | B2* | 1/2007 | Friedman et al. .............. 714/38 |
| 2003/0204784 | A1* | 10/2003 | Jorapur ........................ 714/38 |
| 2004/0003335 | A1* | 1/2004 | Gertz et al. .................. 714/758 |
| 2004/0107415 | A1* | 6/2004 | Melamed et al. ............ 717/124 |

OTHER PUBLICATIONS

"Getting Started with the Eclipse Platform" David Gallardo, Nov. 1 2002.*
David Gallardo, "Getting Started with the Eclipse Platform", Nov. 1 2002.*

* cited by examiner

Primary Examiner—Wei Y Zhen
Assistant Examiner—Junchun Wu
(74) Attorney, Agent, or Firm—Justin Dillon; Schubert Osterrieder & Nickelson PLLC

(57) ABSTRACT

Methods, systems, and media to test a code segment of a source file are disclosed. Various embodiments machine-render a source code skeleton in response to a selection of the code segment, incorporate the code segment into the source code skeleton to generate a temporary source file, insert a monitoring statement into the temporary source file, and compile the temporary source file into a compiled program to output a result. Embodiments may further include executing the compiled program and outputting the result. In addition, some embodiments also initiate compilation of the temporary source file, attempt to resolve a compilation error, and output the compilation error. Some embodiments terminate execution in response to selection of a cancel button. Further, some embodiments delete the temporary source file. Several embodiments also include a file creator, a code gatherer, a code generator, an adaptive compiler, a processor, and an output device.

20 Claims, 6 Drawing Sheets

```
char ReversedStringAux{} = new char[inputString.length()];
for (int i=0; i<inputString.length(); i++)
    ReversedStringAux[I] = inputString.charAt(inputString.length()-i-1);
String reversedString = new String(ReversedStringAux);
```

Fig. 3A

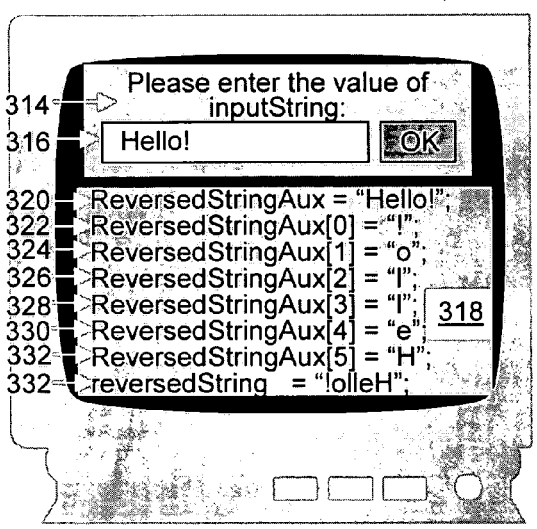

Fig. 3B

```
if ( ($line !~ /^\/\//) && ($line =~
    /(match|netparm1)\s*=.*:\d*\.*\d*/i) )
{
    $label = $1;
    @fields1 = split(/$label\s*=/i,$line);
    @fields2 = split(/:/,$fields1[1]);
    $match_label = $fields2[0];
    @fields3 = split(/\s+/,$fields2[1]);
    $new_num = $fields3[0] / 2;
    $new_line = $line;
    $new_line =~ s/$label\s*=.*\d*\.*\d*/$label=
        $match_label:$new_num/i;
}
```

Fig. 4A

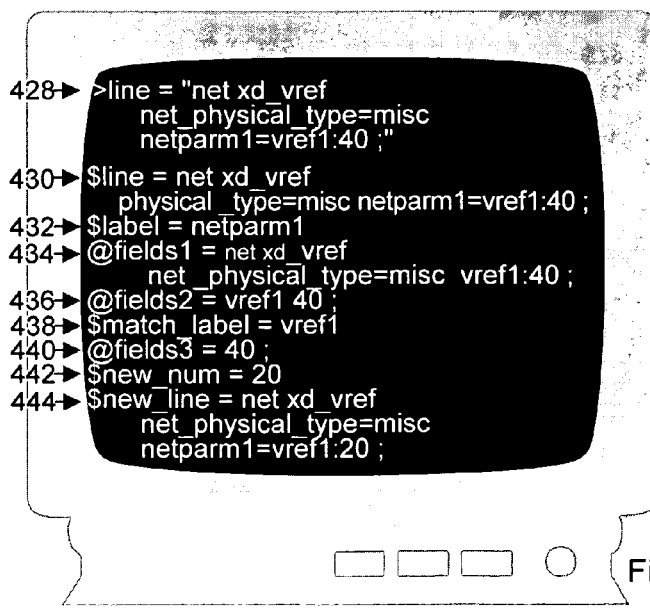

```
510 → // javaexample.java
512 → import java.io.*;
514 → import java.util.*;
516 → public class javaexample
      {
518 →   public static void main( String args[] )
520 →   {
522 →     string offset1str,offset2str;
524 →     double offset1,offset2;
526 →     double array database[10];
528 →     double x,y,n;
530 →     rect(x,y,200,200);
532 →     fill(x,y,50,240);
534 →     for n=1 to 10
536 →     {
538 →     database(n)=n;
540 →     }
542 →   y=5;
544 →   x=database(y);
546 →   offset1=Double.parseDouble(offset1str);
548 →   offset2=Double.parseDouble(offset2str);
550 →   x = x + offset1 + offset2;         508
552 →   database(y)=x
      }
}
```

Fig. 5A 504                                               590

```
510 → // javaexample.java ←
512 → import java.io.*; ←
514 → import java.util.*; ←
516 → public class javaexample ←
      { ←
518 → public static void main( String args[] ) ←
520 → { ←
522 → string offset1str,offset2str; ←
524 → double offset1,offset2; ←
526 → double array database[10]; ←
554 → double x,y; ←
556 → system.out.println( timestamp );
558 → offset1str= "2"; ←
560 → offset2str= "3"; ←
542 → y=5;
562 → database(y)=5; ←
544 → x=database(y);
564 → system.out.println( "x = " + x );
546 → offset1=Double.parseDouble(offset1str);
566 → system.out.println("offset1 = "+offset1);
548 → offset2=Double.parseDouble(offset2str);
568 → system.out.println("offset2 = "+offset2);
550 → x = x + offset1 + offset2;
570 → system.out.println( "x = " + x );
552 → database(y)=x;
572 → system.out.println("database(y)= "
      +database(y));
574 → system.out.println( timestamp );
575 → }
      }
```

```
576 → 2/12/04 22:11:59
578 → x = 5
580 → offset1 = 2
582 → offset2 = 3
584 → x = 10
586 → database(y) = 22
588 → 2/12/04 22:12:01
```

Fig. 5C

```
602
610 → $WANT = 3;
612 →    $count = 0;
614 →    $_ = "One fish two fish red fish blue fish";
616 →    while (/(\w+)\s+fish\b/gi) {
618 →        if (++$count == $WANT) {
620 →            print "The third fish is a $1 one.\n";
622 →        }
624 →    }
```

Fig. 6A

```
606
644 → >Evaluate (./test.pl, 312, 326)
646 → 1
648 → 2
650 → 3
652 → The third fish is a red one.
654 → 4
```

Fig. 6C

```
604
626 → $WANT = 3;
628 →    $count = 0;
630 →    $_ = "One fish two fish red fish blue fish";
632 →    while (/(\w+)\s+fish\b/gi) {
634 →        print "$count \n";
636 →        if (++$count == $WANT) {
638 →            print "The third fish is a $1 one.\n";
640 →        }
642 →    }
```

Eclipse Platform

Navigate  Search  Project  Run  Window  Help

Welcome | X | WASExtensI | DBCExtension | ExecCmdjava | CollectorMe

```
    Log.Log(Comment);
    Continue;
else if ( lcLine.startsWith ( k_GetRegKey.toLowerCase()+ " ")}
{
  string thisPlatform = System.getProperty ("os.name");
  string in ="getRegistryKeky MacroJavaHomeJavaHome \"NKEY_
  if (thisPlatform.startsWith("Win")) {
    StringTokeniser= toks = new stringTokeniser, (In, " ");
    If (toks.countTokens () < 4) {
      Log.Err("Invalid number of arguments");         702
    }
    toks.nextToken ();    // this is the first token "getRegistryKey"
    string sExecFile = toks.nextToken () .trim(); //second token is
    string keyString = toks.nextToken () .trim(); //third token is re
    string vData = toks.nextToken () .trim() //fourth token is the k
    system.out.println("Macro name; "+sExecFile+"Registry key;s
}
  else {
    Log.Err(CollectorMessages.getFormattedMessage (bundle, "WSST_ERR_PLA
}
} else if ( lcLine.startsWith( k_InvokeExt.toLowerCase() + " " ) }
```

704 →
Evaluate
Revert
Open De
Open Ty
Open Su
Show
Cut Copy
Paste
Source
Refactor
Local Hist
Search
Save

Fig. 7

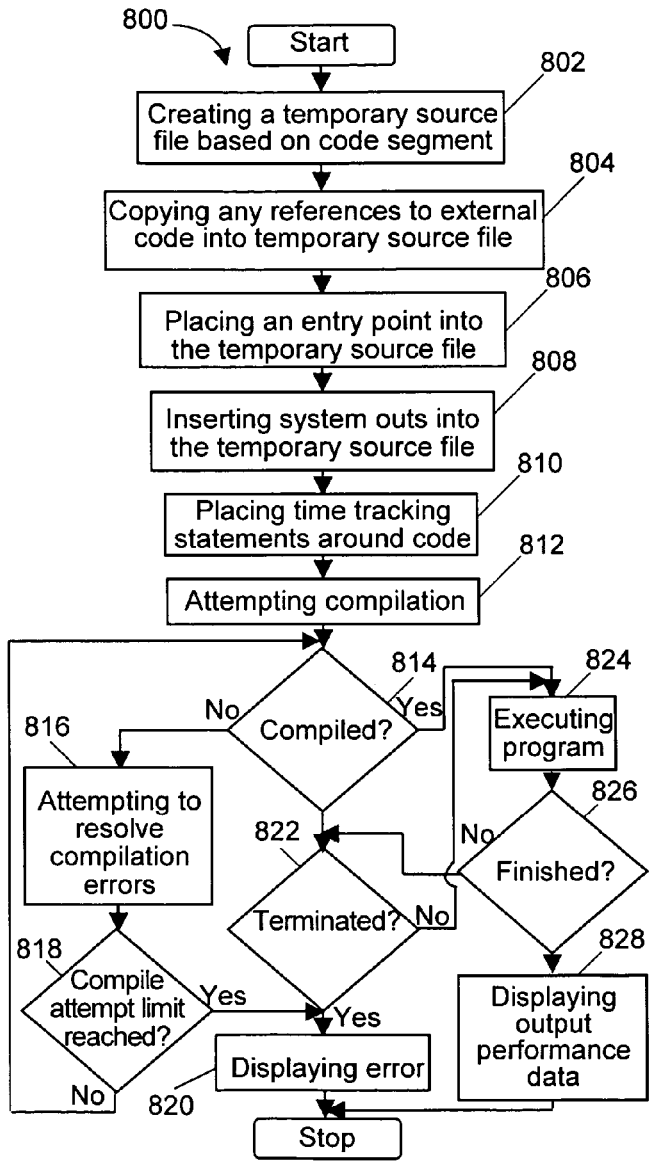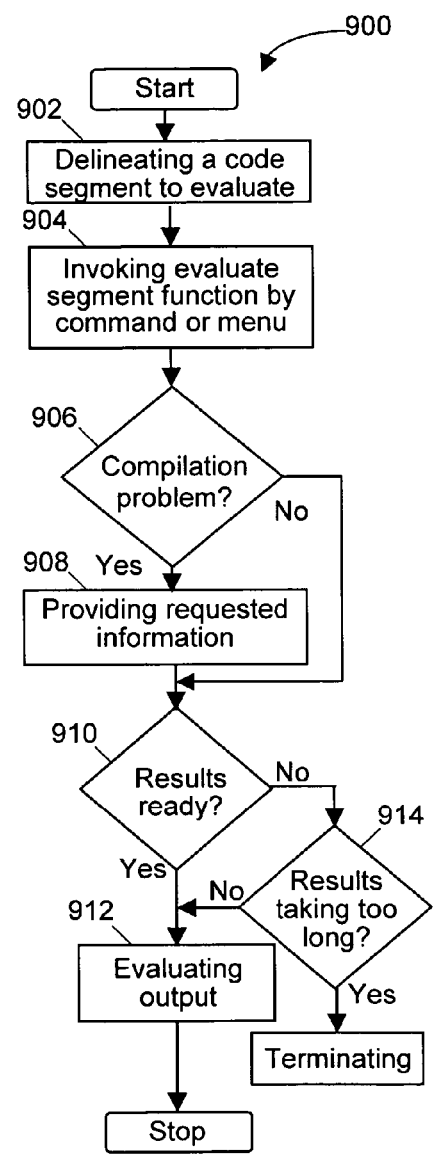
Fig. 8
Fig. 9

EVALUATION OF A CODE SEGMENT

FIELD OF INVENTION

The present invention is in the field of computer software. More particularly, the present invention relates to methods and arrangements to evaluate a code segment of computer software.

BACKGROUND

Computer programmers today commonly design code in a programming editor, an integrated development environment (IDE), an Enterprise Development Technology test environment, or the like. A programming editor includes features for creating and editing source code. An IDE is a programming environment that has been packaged as an application program, typically consisting of a code editor, a compiler, a debugger, and a graphical user interface (GUI) builder. IDEs provide a user-friendly framework for many modem programming languages, such as Visual Basic, Sun Microsystems's Java™, and PowerBuilder. The IDE may be a standalone application or may be included as part of one or more existing and compatible applications. For example, Microsoft Word is designed primarily for word processing. Yet, Microsoft Word is able to incorporate a WordBasic program, which is an IDE. WordBasic provides additional functionality to word processing by allowing a programmer to build scripts to automate certain functions while writing and editing repetitive documents. At the same time, WordBasic may be used to write and debug an entire Visual BASIC program within Microsoft Word.

An example of an Enterprise Development Technology is .NET or Java 2 Platform Enterprise Edition (J2EE): .NET is a Microsoft operating system platform that incorporates applications, a suite of tools, and services to manipulate websites, and J2EE is a platform-independent, Java™-centric environment from Sun for developing, building, and deploying Web-based enterprise applications online. The J2EE platform consists of a set of services, Application Programming Interfaces (APIs), and protocols that provide functionality for developing multi-tiered, Web-based applications. Currently, to test these technologies, a programmer typically either uses a test environment that is able to run the underlying infrastructure or manually deploys a program on the test environment. For example, a programmer may test a Java™ Servlet or J2EE Enterprise JavaBeans (EJB) of a Java™ API to define a component architecture for multi-tier client/server systems. The programmer would test the Servlet or EJB in an Application Server instance that has a WebContainer or EJBContainer in which the code may run. These containers manage the runtime infrastructure to allow the Servlet or EJB to run properly.

Often while developing code within a program editor, IDE, or an Enterprise Development Technology test environment, a programmer would like to quickly verify the behavior of a self-contained code segment. Self-contained refers to code that does not rely on other components to operate. In addition, though the value of a variable may change, the actions of the code during execution remain static. To illustrate, the programmer may be parsing a string, binary shifting, performing logical operations, or formatting. Unfortunately, the programmer is unable to verify unfinished code or unfamiliar code without finishing the code, testing the entire code, fleshing out a temporary source program, and managing the workspace involved.

Often when a programmer designs an application, the programmer codes in a series of source files. Managing test files of this series of source files is cumbersome. Typically, a programmer tests code by writing several smaller files to test segments of each source file of code. While testing the segments, often the programmer tweaks the code to test small changes in the code. Then, the programmer is left with several test codes of separate updates to the series of source files. Managing the updates and deleting the test codes is time-consuming, frustrating to decipher, and risky to ensure the preservation of the ideal update per area of code.

Two approaches are typical in the art for testing a code segment. In a first approach, a programmer manually creates a test program, compiles the program, and then executes the program to investigate the behavior. Although logically effective for testing the code segment, this approach is less than optimal for time and space efficiency for several reasons. One, this approach is error prone because a new source file must be created and imports are manually resolved. Additionally, the steps within this approach add duration to code development. Finally, this approach clutters the working environment with additional test programs to manage, use to incorporate knowledge into the original source program, and delete without losing modifications. Even if a programmer does not use additional source files to test, the programmer exerts more effort to keep the initial work environment clean and clear by deleting all test statements such as print statements of values of variables near any variable reassignments in the code.

Another approach is to employ debugging features of an IDE. Breakpoints and other debugging features aid a programmer in viewing and scrutinizing execution of a source file; however, all of these features complicate the examination with strict requirements of the source file. First, a breakpoint is a location in programming code that, when reached, triggers a temporary halt in the program. Programmers typically use breakpoints to test and debug programs by causing the program to stop at scheduled intervals and examining the status of the program in stages. Undoubtedly, one of the most common debugging procedures is to set breakpoints that will allow the inspection of variables and the values inside conditional statements or loops. This method, however, requires establishing a source file that is fully able to be translated from a programming language into executable computer-readable machine code and running the beginning of the source file up to the breakpoint.

Another debugging feature is, for example, the "inspect" feature of WebSphere Studio Application Developer product (WSAD), an open, portable, universal tooling platform and integration technology developed by International Business Machines, Inc. While debugging an application, this feature will allow a programmer evaluate expressions in a WSAD Debug editor. The programmer selects the entire line where the breakpoint is set, and from the context menu, selects the Inspect option. An Expressions view of a Display window then presents the value of the expression. But, the variable or expression is evaluated merely in the context of the current stack frame and the programmer must keep track of the variable or expression through the context of the entire source program up to the breakpoint. Another difficulty of this approach is the requirement that the developed source program be compliable and executable.

One more debugging feature is a feature such as Hotswap Bug Fixing, which is available while running Eclipse 2.0.2 or 2.1 with Java Virtual Machine 1.4. Created by International Business Machines, Inc., Eclipse is an extensible open source IDE for the development of highly integrated tools in a platform- and language-neutral industry framework. Hotswap Bug Fixing allows a programmer to modify a source file during a debugger session, creating an advantage over modifying the source file by exiting the application, changing the code, recompiling, and then beginning another debugging session. Although it is more convenient to modify code during a debugging session without having to compile and execute the code each time, this feature also requires establishing a fully compliable source file and running the code segment to be evaluated in conjunction with code appearing before the code segment in the source file. Running from the beginning of the code up through the code segment may involve time-consuming interaction with the output, which complicates testing one code segment.

In addition, these debugging features require the source file to have an entry point. An entry point is a point in code that indicates where to begin compiling or executing the source file. For example, code written in C includes an "{" and "}" to delineate the main program. Accordingly, execution begins at the entry point, the "{", and code statements direct the processing flow subsequently until flow ends at the "}". Because WSAD's inspect feature requires an entry point, the inspect feature does not aid a programmer who would like to inspect how a function within a standard library operates. In this example, to use the inspect feature to test a library function, the programmer would write a separate testing program to meet the requirements of being compliable and executable and containing an entry point; then, the programmer would use the separate testing program to call the library function. An additional drawback of the WSAD inspect feature is that this approach requires running the entire program if the source program is not self-executable. Ultimately, this approach focuses on the testing phase of the code life cycle rather than the development or coding phase.

In view of the above, various needs exist in-the art for testing a code segment in a program editor or integrated development environment. More particularly, needs exist for techniques for testing of a code segment that are less time consuming and less cluttering.

SUMMARY OF THE INVENTION

The problems identified above are in large part addressed by methods and arrangements to evaluate a code segment of a source file. One embodiment provides a system which contemplates a file creator, code gatherer, code generator, adaptive compiler, a processor, and an output device. Once a programmer selects a code segment to extract from a source file and test, the file creator may create a temporary source file based upon the code segment. The code gatherer may copy external code referenced within the code into the temporary source file. In other embodiments, the code gatherer copies external code referenced by the rest of the source file into the temporary source file. The code generator may insert monitoring statements into the temporary source file, such as print statements to output changes in variable values or provide runtime data associated with the code segment. The adaptive compiler may compile the temporary source file into a compiled program to generate a result based upon the monitoring statement. The processor may then execute the compiled program, and the output device may communicate the result.

Another embodiment provides a method to test a code segment of a source file. The method generally includes machine-rendering a source code skeleton in response to a selection of the code segment and incorporating the code segment into the source code skeleton to generate a temporary source file. The method further includes inserting monitoring statements into the temporary source file to provide runtime data, for example, a time stamp, associated with the code segment. In one embodiment, the programmer may opt to observe a variable with a monitoring statement. The method further includes compiling the temporary source file into a compiled program to output a result based upon the monitoring statement when the temporary source file is executed. In the case of compilation errors, an embodiment of the method may include options to resolve a compilation error, for example assigning data to a variable, inserting a line of code to import a library, or the like. In embodiments in which the temporary source file compiles into a compiled program, the method may further include executing the compiled program and outputting the result based on the monitoring statement.

An additional embodiment provides a machine-accessible medium to evaluate a code segment of a source file. A machine executing instructions of the medium generally machine-rendering a source code skeleton in response to a user's selection of a code segment. Moreover, the machine incorporates the code segment into the source code skeleton to generate a temporary source file. Then, the machine inserts a monitoring statement into the temporary source file to provide runtime data associated with the code segment. The machine next compiles the temporary source file into a compiled program to output a result based upon the monitoring statement when the temporary source file is executed. In further embodiments, the machine executes the compiled program and outputs the result of the monitoring statement. In some embodiments, the machine may terminate execution in response to a selection of a cancel button. The machine also includes deleting the temporary source file in some embodiments to further assist the programmer in managing test files.

BRIEF DESCRIPTION OF THE DRAWINGS

Other objects and advantages of the invention will become apparent upon reading the following detailed description and upon reference to the accompanying drawings in which, like references may indicate similar elements:

FIGS. 3A-B depict a Java™ code segment to be evaluated with an embodiment of an Evaluate Segment Function using a variable watch box and pop up input, sample input from a user, and corresponding sample output generated by the Evaluate Segment Function;

FIGS. 4A-B depict a Perl code segment to be evaluated with an embodiment of an Evaluate Segment Function, sample input from a user, and corresponding sample output generated by the Evaluate Segment Function;

FIGS. 5A-C depict an example of a code segment of Java™ code together with the source file that contains the code segment to be tested, an embodiment of an associated temporary source file, and generated output;

FIGS. 6A-C depict an example of a code segment of Perl code together with the source file that contains the code segment to be tested, an embodiment of an associated temporary source file, and generated output;

FIG. 7 depicts an embodiment of an Eclipse programming environment, within which a programmer wishes to test a segment of JAVA™ code with an embodiment of an Evaluate Segment Function;

FIG. 8 depicts an example of a flowchart for a method to provide a feature to test any segment of programming code; and FIG. 9 depicts an example of a flowchart for a method to test any segment of programming code.

DETAILED DESCRIPTION OF EMBODIMENTS

Introduction

The following is a detailed description of embodiments of the invention depicted in the accompanying drawings. The embodiments are in such detail as to clearly communicate the invention. The amount of detail offered, however, is not intended to limit the anticipated variations of embodiments. On the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements are contemplated to test a segment of programming code. One embodiment provides a system to automate evaluation of a self-contained segment of programming code in an IDE or Programming Language Code Editor software. Another embodiment provides a system able to, without testing the beginning of the source file, test a code segment of source file not located at the beginning of the source file. An additional embodiment allows the programmer to verify a code segment before the entire source file is compliable, or able to be translated from a programming language into executable computer-readable machine code. For example, one embodiment of the system includes a file creator to create a temporary source file that includes the code segment without manually introducing an entry point, externally referenced code, or the like. The embodiment also includes a code generator to insert monitoring statements, in some cases in response to a programmer's choice of which variables to watch. An adaptive compiler may compile the temporary source file into a compiled program to generate a result based on the monitoring statement. As well, the system may include a processor to execute the compiled program and an output device to communicate the result based on the monitoring statement.

In further embodiments, the adaptive compiler may also merely initiate compilation of the temporary source file into a compiled program and then resolve compilation errors. The adaptive compiler may even prompt the programmer for additional information, inserting lines of code, choosing an initialization of a variable, or the like. The adaptive compiler may also prompt the programmer to choose which variables of which the Evaluate Segment Function will display their values. In addition, the adaptive compiler may also output compilation errors.

In many embodiments, hardware and/or software may implement circuit structure logic to test a segment of programming code. The hardware and/or software may, for instance, create a temporary source file. Through this method, a temporary source file may include and test a code segment. The temporary source file may also optionally insert an entry point and copy external code referenced by the code segment into the temporary source file.

DETAILED DESCRIPTION

Figure 1A:
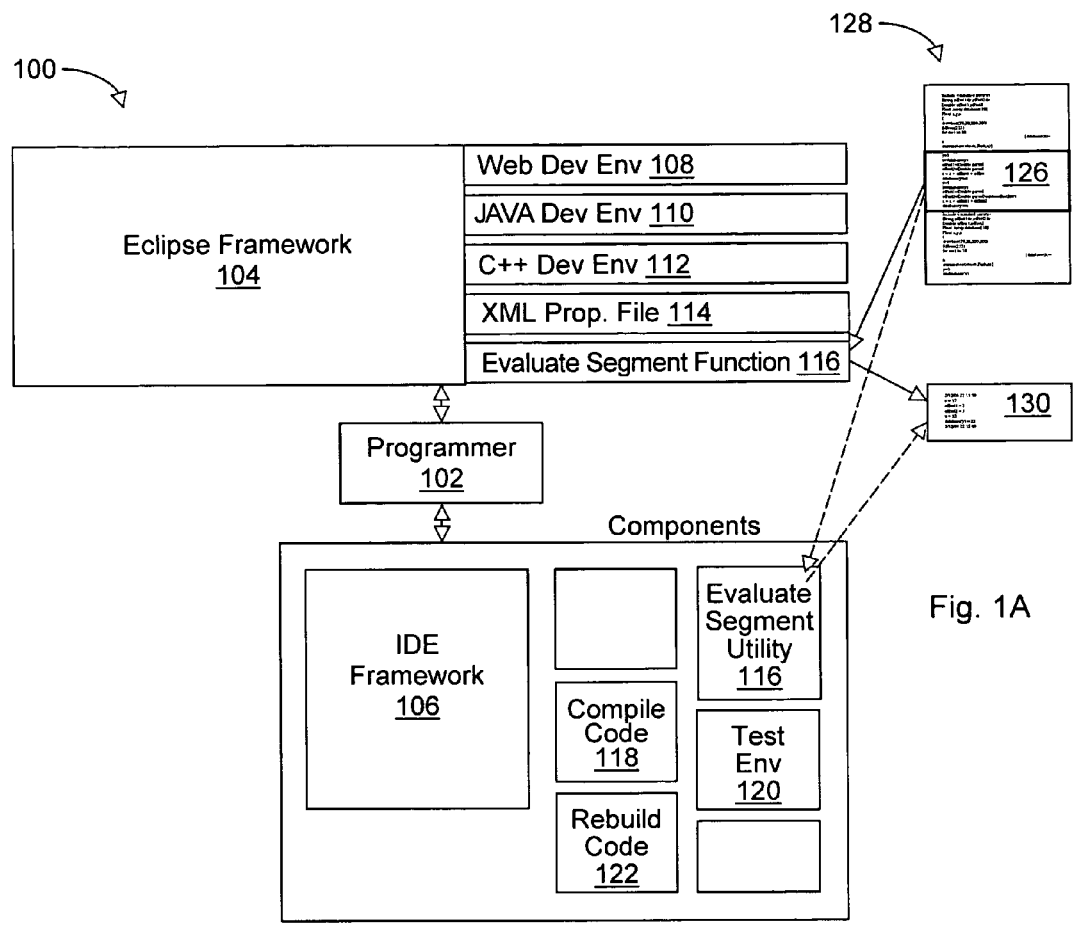
FIG. 1 depicts an embodiment of a system to test a segment of programming code.

Turning now to the drawings, FIG. 1 depicts an embodiment of a system 100 to test a segment of programming code. System 100 includes a programmer 102 interacting with a development environment framework that is able to evaluate a code segment 126 of a source file 128. In one embodiment, system 100 includes a programmer 102 interacting with an IDE framework 106 or an extensible integrated development environment such as an Eclipse open source tool integration platform framework 104. Because Eclipse framework 104 is extensible, snapable plug-ins provide custom capabilities to Eclipse framework 104. Thus, in one embodiment, the programmer may utilize capabilities provided by plug-ins. Plug-ins are self-contained extensions for an existing framework, such as a Web Development Environment 108, JAVA™ Development Environment 110 (e.g., Java™ Development Tool®), C++ Development Environment 112, and an eXtensible Markup Language (XML) Property File 114. In the present embodiment, the Evaluate Segment Function 116 is a plug-in built into the Eclipse framework 104 to test code in any computer language. In another embodiment, Evaluate Segment Function 116 may be JAVA™ specific or C++ specific and, for instance, be named Evaluate JAVA™ Segment Function or Evaluate C++ Segment Function. For example, Evaluate JAVA™ Segment Function may be a separate plug-in into the Eclipse framework 104 and specified through an XML properties file to provide a menu option of Evaluate to the JAVA™ development environment 110.

In addition, a programmer may take advantage of an Evaluate Segment Function 116 that may be plugged into Eclipse framework 104. The Evaluate Segment Function 116 is able to test a code segment 126 that is part of a larger source file 128, and output a result 130 of error messages and/or output.

Code segment 126 may be self-contained; thus, code segment 126 may be able to function alone and static-like in nature but not necessarily in definition. For example, programmed in Java™, code segment 126 may not have to be in a static block. Code segment 126 may be open source or proprietary, indicating that the source file is privately owned and not accessible by the programmer. In one embodiment, Evaluate Segment Function 116 is able to evaluate a code segment of a source file written in a compatible computer language with the Eclipse framework 104. In several embodiments, Evaluate Segment Function 116 is able to evaluate a code segment of a source file not written in the same computer language as Eclipse framework 104. Thus, Evaluate Segment Function 116 is programming-language independent and may be implemented for any programming language IDE or code editor software, for example, Eclipse framework 104 or IDE framework 106.

In one embodiment, code segment 126 may be a self-contained part of a program being developed. Rather than launching a fully compliable source program, the programmer may select a couple of lines of code as code segment 126. In another embodiment, code segment 126 may be part of some existing code that the programmer would like to become more familiar with the way code segment 126 functions properly. For example, code segment 126 may be a part of a third party vendors' Application Program Interfaces (APIs) such as JAVA™ APIs, and the documentation may be ambiguous. In one embodiment, Evaluate Segment Function 116 serves as a programming language education tool. If a programmer is not savvy, or well versed, with a given programming language, this feature may illustrate behavior of the programming language, libraries, and APIs to educate the programmer.

In any case, rather than debugging code segment 126 within an entire source file created by the programmer, the programmer may prefer to first test just the code segment 126. Rather than creating a new source file, inserting code segment 126 to test, inserting any additional code, compiling it, recompiling it, and then testing it oneself, the programmer may use the Evaluate Segment Function 116 to take care of executing the lines of code in code segment 126.

In another embodiment, Evaluate Segment Function 116 may be built into an IDE framework 106 instead, as code that evaluates a code segment within run time of the IDE framework 106. IDE framework 106 may also include other components, for example, a test environment component 120, a compile code component 118, and a rebuild code component 122, as will be understood by a person of ordinary skill in the art. Evaluate Segment Function 116 may function as a component as well and will be further explained in the discussion of FIG. 1B below.

In a further embodiment, a programmer may also use a program editor (not shown) or source code editor which may include Evaluate Segment Function 116 able to evaluate a code segment of a source file. In one embodiment, a programmer may highlight a code segment to be evaluated. Then, Evaluate Segment Function 116 may generate out a new source file that the programmer may compile and run.

In yet another embodiment, a programmer may use the Evaluate Segment Function 116 with Enterprise Development Technologies such .NET or J2EE. Instead of a test environment to run the underlying infrastructure and test these technologies, a programmer may test code segments that are not dependent on the underlying infrastructure with Evaluate Segment Function 116. In this embodiment, the programmer may forgo an Application instance that has a WebContainer or EJBContainer to test a Servlet or EJB, for example.

Figure 1B:
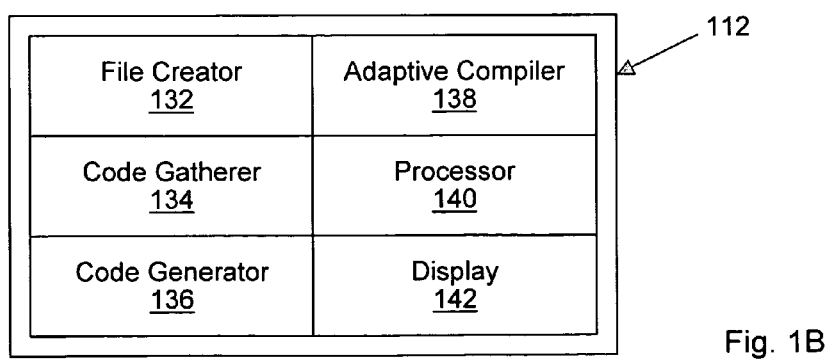

Turning to FIG. 1B, a block diagram depicts an embodiment of sections of Evaluate Segment Function 116 to test a code segment 126 of a source file 128. One embodiment of the Evaluate Segment Function 116 includes several sections, for example a File Creator 132 to create a temporary source file in memory, on a file system, or the like. In some embodiments, the temporary source file may include a source code skeleton, including, for example, variable declarations, to assist code segment 126 to compile. As well, a Code Gatherer 134 inserts code segment 126 of source file 128, an entry point, any external referenced code, and the like into the temporary source file. Additionally, an embodiment includes a Code Generator 136 to insert monitoring statements, in some cases in response to a programmer's choice of which variables to display. In another embodiment, the Evaluate Segment Function 116 is able to perform and produce output of performance tests of code segment 126 of source file 128. For example, often a programmer will tweak a specific crucial and initially slow part of code to be faster and faster.

An Adaptive Compiler 138 also serves as a section of Evaluate Segment Function 116 and initiates compilation of the temporary source file into a compiled program. Depending on the programming language in use, a compiled program refers to a source file prepared for execution. For examples, using Perl code, a compiled program may refer to a Perl program; using Java, a compiled program may refer to byte code; and using C++, a compiled program may refer to an executable program.

In one embodiment, if compilation errors exist, Adaptive Compiler 138 may use smart logic, for example, logic to deduce why the temporary source file did not compile based on the compilation errors. Then, Adaptive Compiler 138 may respond by resolving some compilation errors. For example, in the case of a compilation error due to undefined variables, Adaptive Compiler 138 may pop-up a dialogue box to the programmer and request "please initialize this variable" with input fields allowing the programmer to initialize the variable. Then, Adaptive Compiler 138 may insert the inputted information, additional libraries to be referenced, or the like, into the temporary source file and again attempt to compile the temporary source file into a compiled program.

If the compilation errors are not solvable by these above methods, then the adaptive compiler is able to output the errors for display to an end user. Next, processor 140 is able to execute the compiled program. An embodiment also includes an output device 142 to communicate a result based upon a monitoring statement. Output device 142 may also produce output of code segment 126, for example graphics to a screen; variable values; error messages; or the like. In one embodiment, a pop-up window shows the results of code segment 126 or errors indicating that the code segment is problematic. In one embodiment, after a programmer selected a code segment and submits it to Evaluate Segment Function 116, Evaluate Segment Function 116 compiles and executes a code segment transparently from the perspective of the programmer and displays the resulting output or any errors encountered to the programmer. Results or errors may be output to a display screen, printer, facsimile, brail device, or any other means of communicating feedback of the result or error to the programmer.

Figure 2:
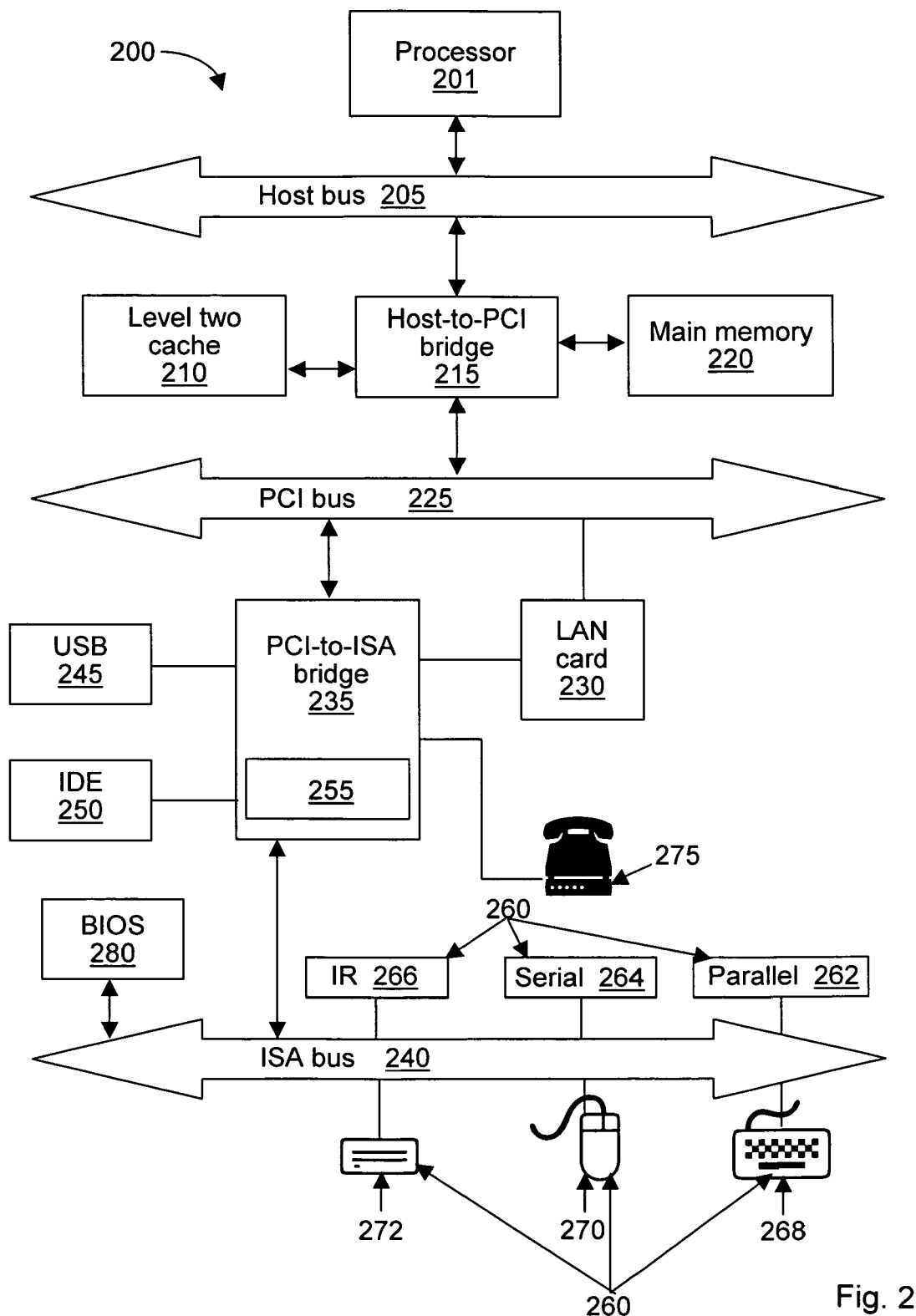
FIG. 2 depicts an embodiment of an information-handling system which is a simplified example of a computer system capable of testing a segment of programming code.

FIG. 2 depicts an embodiment of an information-handling system which is a simplified example of a computer system capable of testing a segment of programming code. Computer system 200 includes processor 201 which is coupled to host bus 205. A level two (L2) cache memory 210 is also coupled to the host bus 205. Host-to-PCI bridge 215 is coupled to main memory 220, includes cache memory and main memory control functions, and provides bus control to handle transfers among PCI bus 225, processor 201, L2 cache 210, main memory 220, and host bus 205. Main memory 220 may include an Evaluate Segment Function 116 from FIG. 1. Continuing in FIG. 2, PCI bus 225 provides an interface for a variety of devices including, for example, LAN card 230. PCI-to-ISA bridge 235 provides bus control to handle transfers between PCI bus 225 and ISA bus 240, universal serial bus (USB) functionality 245, IDE device functionality 250, power management functionality 255, and can include other functional elements not shown, such as a real-time clock (RTC), DMA control, interrupt support, and system management bus support. Peripheral devices and input/output (I/O) devices can be attached to various interfaces 260 (e.g., parallel interface 262, serial interface 264, infrared (IR) interface 266, keyboard interface 268, mouse interface 270, fixed disk (HDD) 272) coupled to ISA bus 240. Alternatively, many I/O devices can be accommodated by a super I/O controller (not shown) attached to ISA bus 240.

BIOS 280 is coupled to ISA bus 240, and incorporates the necessary processor executable code for a variety of low-level system functions and system boot functions. BIOS 280 can be stored in any computer readable medium, including magnetic storage media, optical storage media, flash memory, random access memory, read only memory, and communications media conveying signals encoding the instructions (e.g., signals from a network). In order to attach computer system 200 to another computer system to copy files over a network, LAN card 230 is coupled to PCI bus 225 and to PCI-to-ISA bridge 235. Similarly, to connect computer system 200 to an ISP to connect to the Internet using a telephone line connection, modem 275 is connected to serial port 264 and PCI-to-ISA bridge 235.

While the computer system described in FIG. 2 is capable of executing the invention described herein, this computer system is simply one example of a computer system. Those skilled in the art will appreciate that many other computer system designs are capable of performing the invention described herein.

FIGS. 3A-B depict an example Java™ code segment in FIG. 3A to be evaluated with an embodiment of an Evaluate Segment Function 116 from FIG. 1 using a variable watch box and pop up input, as shown in FIG. 3B. An embodiment of Evaluate Segment Function 116 may evaluate a block of Java™ code, such as code segment 302, which includes lines 306-312 to input a string and reverse the characters. Line 306 defines ReversedStringAux as a new character array object by referencing the inputString object. The array values of ReversedStringAux become a copy of inputString's values.

Accordingly, FIG. 3B includes sample input 316 from a user, and corresponding sample output 318 outputted by Evaluate Segment Function 116 onto, for example, Screen 304. Because inputString on line 306 of FIG. 3A has not been defined within code segment 302, Evaluate Segment Function 116 may use some smart logic in compiling to attempt to avoid returning a compile-time error. In one embodiment, Evaluate Segment Function 116 creates a pop-up window 314 to prompt a programmer to input a value for inputString. In the example in FIG. 3B, the programmer has input "Hello!" to be the contents of inputString. In some embodiments, the programmer chooses which variables to observe; in this example, the programmer has chosen to observe the values of ReversedStringAux and reversedString. In one embodiment, the values of chosen variables appear in a variable watch box, for example, Variable Watch Box 318. Line 320 displays the initial value of ReversedStringAux from line 306. Line 308 begins a for loop that uses int as an index beginning at zero. Line 310 starts at the end of inputString and saves that character into the first character of ReversedStringAux. With each increment of int, line 310 fills another character of ReversedStringAux with a character from inputString in reverse order. Lines 322-332 display each change in character within ReversedStringAux. When int reaches the length of inputString, code segment 302 exits the for loop and continues with line 312. Line 312 defines a new string object named reversedString, converts reversedStringAux into a string variable type, and saves reversedStringAux as a string into reversedString. Line 334 displays reversedString's new value to Variable Watch Box 314.

FIGS. 4A-B depict an example Perl code segment 402 to be evaluated with an embodiment of an Evaluate Segment Function 116 from FIG. 1, sample input 430 from a user, and corresponding sample output on screen 404 generated by Evaluate Segment Function 116. Evaluate Segment Function may evaluate a block of Perl code, such as code segment 402, which includes lines 406-426. Line 406 includes an undefined variable, $line; thus, in this embodiment, Evaluate Segment Function 116 prompts the programmer to input the value of $line. In this example, the programmer input $line as "$line="net xd_vref net_physical_type=misc netparm1=vref1:40;", as shown in line 428. Code segment 402 includes lines 406-426 to find a particular number in the inputted line and replace that number. First, line 406 determines whether to process further based on the contents of the scalar variable $line. Next, line 406 of code segment 402 determines whether the contents of the scalar variable $line starts with the string "\\". If not, line 406 contains instructions to determine whether the contents of the $line scalar variable contains a particular pattern. The pattern will match any string that contains the string "match" or the string "netparm 1" followed 0 or more white space (\032, \009, \013) characters; an equal sign "="; any non-new line (\013) characters; a colon ':' character; any digits; any periods '.'; and finally, any digits without regard to case. If the pattern matches the contents of the $line scalar variable and the character string "match" matches, then the string "match" is stored in a scalar variable named $label in line 410. If the character string "netparm1" matches in line 410; however, then the character string "netparm1" is stored in the scalar variable $label instead. Next, line 412 contains instructions to divide the contents of the $line scalar variable into substrings. The division between each string is the contents of the $label scalar variable followed by zero or more white space characters and an equal sign without regard to case. The substrings are stored in a scalar array variable called @fields1. Then, in line 414, the second substring from the previous step is divided into substrings where the division between each string is the colon ':' character. Line 414 stores the substrings in a scalar array variable called @fields2. In line 416, the first substring from the previous step is stored in a scalar variable named $match_ label. Next, line 418 divides the second substring from the previous step into substrings where the division between each string is 1 or more white space characters. The substrings are stored in a scalar array variable called @fields3. Line 420 converts the first substring from the previous step from a string representation to a real number. Then, line 420 divides the real number by the literal value 2 and stores the result into a scalar variable named $new_num. Subsequently, line 422 assigns the contents of the scalar variable in $line to the scalar variable $new_line. Line 424 substitutes the contents of the $new_line scalar variable that contains the contents of the scalar variable $label, any white space characters, an equal '=' sign, any non-new-line characters, any digits, any periods '.', and any more digits, for the contents of the scalar variable $label, an equal '=' sign, the contents of the scalar variable $match_label, a colon ':', and the character string representation of the contents of the scalar variable $new_num without respect to case. Lines 430-444 depict values of variables within code segment 402, output for the programmer to observe.

FIGs 5A-C depict an example of a code segment 508 of Java™ code together with the source file 502 that contains the code segment to be tested, an embodiment of an associated temporary source file 504, and generated output 506. In this embodiment, source file 502 begins with a comment line 510 indicating its title, "//javaexample.java". Next, source file 502 includes lines 512 and 514, "import java.io.*;"and "import java.util.*;". Lines 512 and 514 reference the standard libraries, java.io and java.util to provide access to functions defined in those libraries. Then, line 516 defines a public class javaexample; and line 518 defines a public main function that may input string arguments and returns a null value. Following in the source file 502, in line 520, a "{" represents the entry point of the main function. Next, in line 522, source file 502 defines offset1str and offset2str as string type variables. In line 524, source file 502 defines offset1 and offset2 as double type variables. In line 526, source file 502 defines database as an array variable including 10 double elements within it. Then, in line 528, source file 502 defines x, y, and n as double variables. In line 530, with "rect (x, y, 200, 200);", source file 502 would attempt to draw a box; however, x and y are not yet defined. In line 532, with "fill (x, y, 50, 240);", source file 502 would attempt to fill in color inside the box; however, x and y are still not yet defined. In line 534, "for n=1 to 10"begins a for loop to repeat the contents between the "{" and the "}" in lines 536 and 538 for 10 times. Within the for loop, line 538 which reads, "{database (n)=n", assigns elements of the database array as sequential numbers 1through 10. The last lines 542-552 appear shadowed inside a shaded area 508; the programmer selected these lines for Evaluate Segment Function 116 to test. In another embodiment, the programmer may shade lines of code that are not sequential; for example, a code segment may include lines of code dispersed through a source file in nonadjacent lines by pressing the Control key while highlighting lines with the Shift key using a GUI.

FIG. 5B depicts one embodiment of Evaluate Segment Function 116's alteration of the programmer's shaded area 508 to include automated debugging statements, such as a print statement inserted following an assignment statement of a variable expression or the like. In addition, this embodiment of Evaluate Segment Function 116 machine-renders a source code skeleton 590. Machine-rendering indicates that software creates the source code skeleton for the user; thus, Evaluate Segment Function 116 allows a user to test a code segment merely by selecting the lines of code. A source code skeleton prepares the code segment for compilation by including external reference lines, variable definitions, assignment statements, and/or the like. For example, source code skeleton 590 includes various definition lines from the rest of the source program, for example, lines 510 and 512's standard library references, "java.io.*" and "java.util.*". In another embodiment, Evaluate Segment Function 116 may copy and paste the content lines of code of the standard libraries referenced instead of references to external code.

In addition, Evaluate Segment Function 116 includes a modified line 528 as line 554 to define x and y as float type variables. Line 554 does not define "n" because in this embodiment Evaluate Segment Function 116 includes only variable definitions of variables used in the selected code segment 508. In other embodiments, Evaluate Segment Function 116 copies more variable definitions over from the original source file. Next, because the selected shaded area 508 does not include an entry point, Evaluate Segment Function 116 provides a copy of entry point 520 from an unshaded section of source file 502. Through temporary source file 504, however, Evaluate Segment Function 116 is able to provide testing of segments of code without requiring the testing to step through a source file from the beginning. Any code segment may be chosen whether or not an entry point exists within the code segment.

In some embodiments, a programmer may choose to monitor performance. In which case, one embodiment of Evaluate Segment Function 116 adds lines 556 and 574 to print the time that the program begins and ends to provide performance data to the programmer. In other embodiments, further performance information is evaluated, for example, memory required for the code segment's operations.

In one embodiment, if a variable is undefined, such as offset1str, offset2str, and database(y) within the selected shaded area 508, Evaluate Segment Function 116 will prompt the programmer to enter values for any undefined variables. In this case, the programmer entered values and Evaluate Segment Function 116 included the following assignment statements as a result: "offset1str="2";" (line 558), "offset2str="3";" (line 560), and "database(y)=5;" (line 562). In other embodiments, Evaluate Segment Function 116 uses smart logic to choose variable assignments based on the rest of the source file and default numbers to assign.

In several embodiments, Evaluate Segment Function 116 prompts programmer 102 to choose which variables, particularly from the selected code segment to have their values displayed and inserts print statements accordingly. In this example, programmer 102 did not choose to monitor variable y but chose to monitor the variables x, offset1, offset2, and database(y). Thus, the print statements "system.out.print1n ("x="+x);", "system.out.print1n ("offset1="+offset1);", "system.out.print1n ("offset2="+offset2);", "system.out.print1n ("x="+x);", and "system.out.print1n ("database(y)="+database(y))" appear in lines 564, 566, 568, 570, and 572, respectively. The variable x is output twice because the value changed twice. In other embodiments, the programmer may opt to view more information printed to the screen by the print statements. For example, a programmer may opt to view the line number of the assignment change per assignment.

Next, FIG. 5C depicts the output 506 produced by temporary source file 504. First, the beginning time stamp outputs to the screen, in this case, programmer 102 has chosen to see "Feb. 12, 2004 22:11:59" in line 574. Then, the print statements, lines 564, 566, 568, 570, and 572, output the variable changes to the screen. Line 576 indicates that "x=5" in response to the print statement in line 564. Line 578 indicates that "offset1=2" in response to the print statement in line 566. Line 580 indicates that "offset2=3" in response to the print statement in line 568. Line 582 indicates that "x=10" in response to the print statement in line 570. Line 584 indicates that "database(y)=10" in response to the print statement in line 572. Finally, the ending time stamp outputs to the screen, "Feb. 12, 2004 22:12:03" (line 586).

FIGS. 6A-C depict an example of a code segment of Perl code 608 together with the source file 602 that contains the code segment to be tested, an embodiment of an associated temporary source file 604, and output 606 generated by the temporary source file 604. In this embodiment, source file 602 includes lines 610-624 to search through a string for an $n^{th}$ occurrence of a match and return an attribute of the $n^{th}$ occurrence. In particular, source file 602 seeks the $3^{rd}$ occurrence of fish and returns its preceding adjective, red. In line 610 of source file 602, "$WANT=3;", indicates that $WANT is a scalar variable and its value is 3. Line 612, "$count=0", indicates that $count is a scalar variable and its value is 0. Line 614, "$_="One fish two fish red fish blue fish";", indicates that the programmer is setting the string, "One fish two fish red fish blue fish", to the default scalar variable.

Line 616, "while (/(\w+)\s+fish\b/gi) {", begins a while loop. With the expression (/(\w+)\s+fish\b/gi), the programmer is indicating to instantiate a regular expression matching engine, compile it into regular expression matching program, and pass the expression to the regular expression matching program. The first "/" indicates to run the regular expression engine against the default scalar variable. As well, the parenthesis "(" indicates to start a capture group. Next, the "\w+" indicates to match one or more of any character. ")" indicates to store matches into a regular expression variable called $1. \s+ means match one or more white space characters but includes no parenthesis to indicate to capture those characters. Next, the expression contains instructions to look for the literal string "fish". "/b" is a zero-width atomic expression indicating to match "fish" only on a word boundary. "/" delineates the regular expression "fish" and the word boundary. "g" indicates globally matching, meaning "fish" could be on a new line. "i" is a regular expression compilation variable indicating any literal character matching case-insensitive. The while loop may stop when the regular expression does not successfully match, for example, when the pointer hits the end of the string.

Within the while loop, line 618, "if (++$count==$WANT) {", indicates a comparison of a pre-incremented $count and $WANT. If $count and $WANT are equivalent, then line 620 is processed. Line 620, "print "The third fish is a $1 one.\n";", indicates to output to the screen the word immediately before the third instance of fish in $_. Line 622, "}", closes the if statement from line 618. Line 624, "}", closes the while loop begun in line 618.

In one embodiment, programmer 102 from FIG. 1 selects shaded area 608 in FIG. 6 to submit to Evaluate Segment Function 116 from FIG. 1 to test. In one embodiment, Evaluate Segment Function 116 next creates temporary source file 604 to test selected shaded area 608, as shown in FIG. 6B. Lines 626, 628, and 630 may serve as a source code skeleton for shaded area 608. First, in line 626, temporary source file 604 replicates the assignment of 3 to $WANT. Following, in line 628, temporary source file 604 replicates the assignment of 0 to $count. After replicating the assignment of the string "One fish two fish red fish blue fish" in line 630, temporary source file 604 replicates the while loop, "while (/(\w+)\s+ fish\b/gi) {" in line 632. Within the while loop, however, temporary source file 604 adds a print statement in line 634 to monitor the value of the variable $count, "print "$count n";". After the new print statement, temporary source file continues with "if (++$count==$WANT) {print "The third fish is a $1 one.\n";}}" in lines 636-642.

In this embodiment, programmer 102 chose not to monitor the performance of selected shaded area 608; thus, in this embodiment, Evaluate Segment Function 116 did not add timestamp statements or any other time lapsing indication as the program begins and ends. In other embodiments, programmer 102 may opt to monitor performance of selected shaded area 608 including compilation speed, execution speed, memory management, and the like.

Just as in the case of Java™ code, in one embodiment, if a variable is undefined within the selected shaded area 608, Evaluate Segment Function 116 will prompt the programmer to enter values for any undefined variables. In other embodiments, Evaluate Segment Function 116 uses smart logic to choose variable assignments based on the rest of the source file and default numbers to assign.

In several embodiments, Evaluate Segment Function 116 also prompts programmer 102 to choose which variables, particularly from the selected code segment 608, to have their values displayed and inserts print statements accordingly. In this example, programmer 102 chose to monitor the variables $count. Thus, the print statement "print "$count n";" appears in line 634. In other embodiments, as in some Java™ embodiments, the programmer may opt to view more information printed to the screen by the print statements.

Next, FIG. 6C depicts the output 606 produced by temporary source file 604. In this embodiment, in line 644, "Evaluate (./test.pl, 312, 324)" indicates that this embodiment tests code of the source file from a command line. In other embodiments, a programmer may run a source file of any programming language through a GUI. In this embodiment, Evaluate Segment Function 116 is called with Evaluate, though many other names are possible to call this function, for example Test. The first argument, "./test.pl" may indicate the source file 602 from which to test a segment; the second argument "312" may indicate the first line of the selected shaded area 608; and the third argument "314" may indicate the final line of the selected shaded area 608. In another embodiment, these arguments are defined to be passed to Evaluate Segment Function 116 in a different order. In further embodiments, Evaluate Segment Function 116 receives different arguments, for example, a source file, a beginning line, and the numbers of lines included past the beginning line.

The next lines of FIG. 6C show the variable changes output to the screen. Lines 646, 648, 650, and 654 indicate the values of $count as $count increments within iterations of the while loop in line 636, "if (++$count==$WANT)". Line 652 outputs, "The third fish is a red one," based on code line 638, "print "The third fish is a $1 one.\n";".

FIGS. 5A-C depict an example of Evaluate Segment Function 116 applied to Java™ code and FIGS. 6A-C depict an example of Evaluate Segment Function 116 applied to Perl code. In fact, Evaluate Segment Function 116 may analyze any lines of a source file in any programming language and return an output, an error message, or the like.

FIG. 7 depicts an embodiment of an Eclipse programming environment, within which a programmer wishes to test a segment of JAVA™ code with an embodiment of an Evaluate Segment Function. Within this Eclipse programming environment, a programmer has been programming JAVA™. This testing process may be made even more accessible through a right mouse click menu to display an Evaluate option 704, for example, to call the Evaluate Segment Function 116 from FIG. 1. In this embodiment, the programmer is able to select a code segment 702 in FIG. 7, click the right mouse button, and opt Evaluate 704 to invoke Evaluate Segment Function 116. In other embodiments, a right button mouse click, popup menu option, tool bar option, or menu bar option may provide access to this testing process within a GUI programming environment or program editor. Within a command-line utility, the testing process may be invoked with a command call to accept, for example, line numbers to indicate the selected text as an argument to the command-line utility.

Referring now to FIG. 8, there is shown an example of a flowchart 800 for a method to provide a feature to test any segment of programming code. In response to lines of code inputted through a graphical interface or command link as a code segment, flowchart 800 begins with creating a temporary source file based on that code segment. In one embodiment, Evaluate Segment Function 116 from FIG. 1 creates the temporary source file. A temporary source file is a compilable source file in which to insert the code segment. Through this method, a temporary source file may include and test a code segment that may not be compilable alone or a code segment that is a part of a source file that may not be compilable alone.

Next, flow chart 800 addresses resolving imports. Evaluate Segment Function 116 may automatically resolve necessary imports for compiling the temporary source file by either copying all imports from the original source file directly or using an IDE feature that is used by a person of ordinary skill in the art. Instead of copying only references to external code into the temporary source file, in another embodiment Evaluate Segment Function 116 copies the contents of any external code referenced by the source file into the temporary source file. In a further embodiment, flow chart 800 copies external code referenced only if the code segment relies on the external code. In some embodiments, Evaluate Segment Function 116 prompts the programmer for import statement validation in case of ambiguous package names. As well, Evaluate Segment Function 116 may throw and display errors in case the imports cannot be determined, for example, when the original source file is incomplete. In some cases, the temporary source file may be smaller than the source file. The temporary source file may also be larger than the source file, for instance, due to external code referenced by the code segment into the temporary source file.

In one embodiment, the Evaluate Segment Function verifies whether the code segment has an entry point. Then, if not, Evaluate Segment Function inserts an entry point into the temporary source file (element 806). In order to monitor variable changes, system outs are placed after every assignment line of code in the temporary source file (element 808). In some embodiments, the programmer is prompted to choose which variables to watch, in which case, only those variables are monitored. In particular, Evaluate Segment Function 116 may display all the variables in the temporary source file as check boxes in a new window. Evaluate Segment Function 116 may save the programmer's selection of the check boxes representing variables when the programmer pressed the OK button of the new window. In another embodiment, all of the variables are displayed to be monitored through a watch screen or window. In some cases, a programmer may wish to monitor performance of the code, for example to see how quickly a code segment operates. In these cases, time tracking statements are placed around the code segment (element 810).

After the temporary source file is prepared, compilation is attempted in element 812. In one embodiment, Evaluate Segment Function 116 attempts to transparently compile the temporary source file into a compiled program. Next decision element 814 questions whether the temporary source file compiled without error. If the temporary source file cannot be compiled, then flow proceeds to element 822 to attempt to resolve compilation errors, for example, by assigning information to a variable or inserting a line of code. In some embodiments, method 800 resolves compilation errors through interacting with the programmer, if appropriate, by prompting the programmer for a library name to reference. Additionally, in one embodiment, if compilation output indicates the existence of un-initialized variables, Evaluate Segment Function 116 may prompt the programmer to enter initialization logic for these variables. Then, Evaluate Segment Function 116 may insert the initialization logic into temporary source file in an appropriate location, for example, above the line that caused compilation to fail. Unless a compile attempt limit is reached (element 824), Evaluate Segment Function 116 attempts to recompile temporary source file again (element 814). If the compile attempt limit is reached, then the error is displayed to the programmer (element 826) and flow stops.

If the compile attempt limit is not reached and temporary source file compiles, then Evaluate Segment Function 116 attempts to execute the compiled program transparently (element 816). If execution of the compiled program completes (element 818), then Evaluate Segment Function 116 may display the results. For examples, Evaluate Segment Function 116 may display the values of all the variables, only variables selected by the programmer, the system out and system error output into a new window or dialog box, as well as output performance data (element 820). In some embodiments, Evaluate Segment Function 116 then returns control to the IDE.

In some cases, execution may not complete, for example, if the programming environment has frozen. If the execution has not completed yet, then the programmer may use a kill or cancel feature that allows the programmer to command an exit out of the execution of those lines of code, for example to kill runaway code. In some embodiments, the programmer may use the same feature to exit out of the compilation of those lines of code. If the programmer terminates the execution before the compiled program is finished executing, then if an error is applicable, the error is displayed (element 826) and flow ends.

FIG. 9 depicts an example of a flowchart for a method to provide a feature to test any segment of programming code, according to a programmer's perspective. After the programmer opens a source file in an IDE or Code Editor, flowchart 900 begins with element 902, when the programmer delineates a source file's code segment to evaluate. In some embodiments, the programmer inputs lines of code to evaluate by highlighting the code segment in a GUI environment. In other embodiments, the programmer indicates through a command prompt. For example, entering "Evaluate (SourceProgram, 10, 20)" into a command prompt may delineate lines 10 through 20 of SourceProgram. The source file may be written in any computer language and may or may not be open source.

After the programmer has delineated the code segment to evaluate, the programmer invokes a code segment evaluator, for example, the Evaluate Segment Function 116 from FIG. 1, by command line or menu option (element 904). If there is compilation problem (element 906), then the programmer may respond by providing requested information (element 908). If there is no compilation problem, then if results are ready (element 910), then the programmer may evaluate the output of the code segment's execution (element 912). If the results are not yet ready (element 910), and the programmer is willing to wait (element 914), then the programmer may continue to wait for results. If the programmer feels the results are taking too long (element 914), then the programmer may terminate execution. In one embodiment, execution may be terminated by a key sequence, for example, pressing the Escape key. In another embodiment, execution may be terminated by choosing a menu option or pressing a GUI button on an IDE screen. At this point, the programmer may evaluate the results of the programmer's interaction with the code segment's performance with the Evaluate Segment Function 116. Thus, Evaluate Segment Function 116 tends to focus on and assist the programmer during the development/coding cycle of the software development life cycle rather than the testing phase of the development life cycle.

After evaluating the code segment on a GUI, the programmer may shut down the output window by using the window's close button. When, the programmer closes the output window, in some embodiments, the temporary source file may be deleted; thus, Evaluate Segment Function 116 may handle file management of test files and assist the programmer in keeping the code environment uncluttered. Next, the programmer may tweak the self-contained code segment and re-Evaluate the code segment. Otherwise, the programmer may evaluate another code segment or move forward with code development.

One embodiment of the invention is implemented as a program product for use with a system such as, for example, as shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, indicate embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements for evaluation of a code segment. It is understood that the form of the invention shown and described in the detailed description and the drawings are to be taken merely as examples. It is intended that the following claims be interpreted broadly to embrace all the variations of the example embodiments disclosed.

What is claimed is:

1. A method to test a code segment of a source file, comprising:
    selecting the code segment from the source file for testing based upon input from a user, the code segment being self-contained;
    machine-rendering a source code skeleton in response selecting the code segment, wherein machine-rendering comprises choosing additional code to include in the source code skeleton to supplement the code segment for compilation;
    verifying whether the code segment has an entry point to determine that the code segment does not have an entry point;
    inserting the entry point into the source code skeleton in response to determining that the code segment does not have the entry point;
    incorporating the code segment into the source code skeleton to generate a temporary source file;
    inserting a monitoring statement into the temporary source file, the monitoring statement to provide runtime data associated with the code segment;
    compiling the temporary source file into a compiled program; and
    executing the compiled program to output a result based upon the monitoring statement.

2. The method of claim 1, further comprising:
    displaying the result in response to the executing, wherein the result is based upon the monitoring statement.

3. The method of claim 1, wherein the compiling comprises: initiating compilation of the temporary source file;
    attempting to resolve a compilation error; and
    outputting the compilation error.

4. The method of claim 3, further comprising assigning data to a variable to resolve the compilation error.

5. The method of claim 1, wherein the compiling comprises:
    initiating compilation of the temporary source file; and
    resolving a compilation error encountered during compilation.

6. The method of claim 1, wherein machine-rendering comprises copying external code referenced by the code segment into the temporary source file.

7. The method of claim 1, wherein inserting the monitoring statement comprises prompting a programmer to select a variable to associate with the result and inserting an assignment statement into the temporary source file to capture the runtime data from the selected variable.

8. The method of claim 1, wherein inserting the monitoring statement comprises inserting a time stamp statement into the temporary source file to capture a time stamp.

9. A system to test a code segment of a source file, comprising: an interface to select the code segment based upon input from a user, the code segment being self-contained; a file creator to machine-render a source code skeleton to create a temporary source file in response to a-selection of the code segment via the interface, the file creator to machine-render the source code skeleton with additional code, the file creator to choose the additional code based upon the code segment to supplement the code segment for compilation; a code gatherer to verify whether the code segment has an entry point to determine that the code segment does not have an entry point, insert the entry point into the source code skeleton in response to determining that the code segment does not have the entry point, and copy the code segment into the source code skeleton to generate a temporary source file; a code generator to insert a monitoring statement, the monitoring statement to provide runtime data associated with the code segment; an adaptive compiler to compile the temporary source file into a compiled program to generate a result based upon the monitoring statement; a processor to execute the compiled program; and an output device to communicate the result.

10. The system of claim 9, wherein the file creator comprises an extensible integrated development environment having a language development tool plug-in.

11. The system of claim 9, wherein the interface comprises a program editor selected from a group of program editors comprising a Graphical User Interface program editor and a command line program editor.

12. The system of claim 9, wherein the file creator is able to create the temporary source file based upon the code segment, wherein the code segment is selected from a group of code segments comprising a code segment to parse strings, a code segment to perform binary shifting, a code segment to format files, a code segment of an Application Programming Interface, and a code segment of a library.

13. The system of claim 9, wherein the adaptive compiler is able to initiate compilation of the temporary source file, output a compilation error, and alter contents of the temporary source file to resolve the compilation error.

14. A computer program product comprising a computer useable medium having a computer-readable program, wherein the computer-readable program when executed on a computer, cause said computer to perform operations, comprising:
    selecting a code segment from a source file for testing based upon input from a user, the code segment being self-contained;
    machine-rendering a source code skeleton in response to selecting the code segment, wherein machine-rendering comprises incorporating additional code other than the code segment into the source code skeleton;
    verifying that the code segment has an entry point to determine that the code segment does not have an entry point;
    inserting the entry point into the source code skeleton in response to determining that the code segment does not have the entry point;
    incorporating the code segment into the source code skeleton to generate a temporary source file;
    inserting a monitoring statement into the temporary source file, the monitoring statement to provide runtime data associated with the code segment;
    compiling the temporary source file into a compiled program; and executing the compiled program to output a result based upon the monitoring statement.

15. The computer program product of claim 14, wherein the computer-readable program when executed causes the computer to perform further operations comprising:

displaying the result in response to the executing, wherein the result is based upon the monitoring statement.

16. The computer program product of claim 14, wherein compiling comprises inserting a line of code into the temporary source file to resolve a compilation error.

17. The method of claim 1, wherein machine-rendering further comprises modifying the additional code, wherein the additional code is from the source file, and inserting modified additional code into the source code skeleton.

18. The method of claim 1, wherein choosing additional code comprises copying the additional code from the source file and pasting the additional code into the source code skeleton, the additional code comprising at least a variable definition, a variable assignment, a library reference, and the entry point.

19. The system of claim 9, wherein the file creator comprises functionality to machine-render by modifying the additional code, wherein the additional code is from the source file, and inserting modified additional code into the source code skeleton.

20. The system of claim 9, wherein the file creator comprises functionality to copy the additional code from the source file and paste the additional code into the source code skeleton, the additional code comprising at least a variable definition, a variable assignment, a library reference, and the entry point.

* * * * *